M. P. HIGGINS.
Hydraulic-Elevator.

No. 203,271. Patented May 7, 1878.

2 Sheets—Sheet 1.

Witnesses:
Edward K. Hill.
Edward F. Tolman.

Inventor:
M. P. Higgins

M. P. HIGGINS.
Hydraulic-Elevator.

No. 203,271. Patented May 7, 1878.

Witnesses:
Edward K. Hill.
Edward F. Tolman.

Inventor:
M. P. Higgins

UNITED STATES PATENT OFFICE.

MILTON P. HIGGINS, OF WORCESTER, MASSACHUSETTS.

IMPROVEMENT IN HYDRAULIC ELEVATORS.

Specification forming part of Letters Patent No. 203,271, dated May 7, 1878; application filed February 1, 1875.

*To all whom it may concern:*

Be it known that I, MILTON P. HIGGINS, of Worcester, State of Massachusetts, have invented an Improved Hydraulic Elevator, of which the following is a specification:

The object of my invention is, first, by certain modifications in the construction, to facilitate the erection of direct-acting hydraulic elevators, such modifications enabling me to sink the water-cylinders to great depths into the earth by the use of the water itself; second, to simplify the construction of water-elevators by improvements in the valve which controls the inlet and outlet; third, to increase the safety of hydraulic elevators with long hollow rams, open at the bottom, by the introduction of a check-valve.

Figure 1:
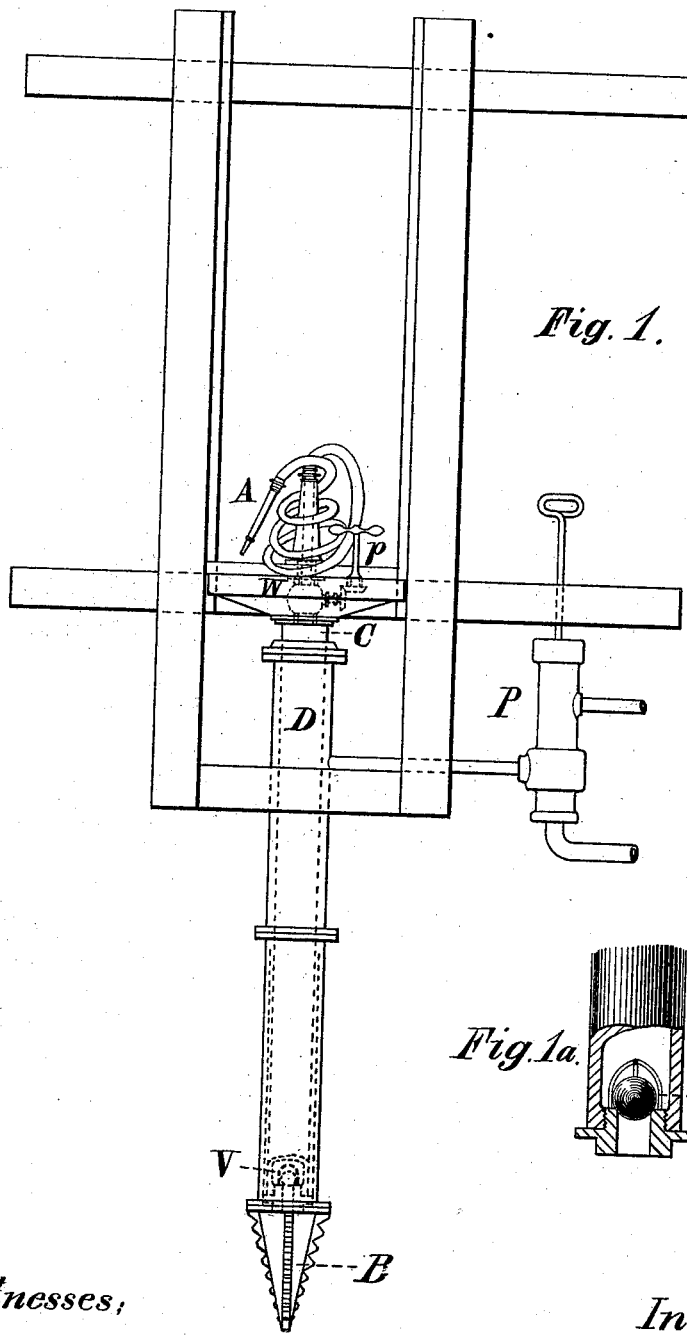
Figure 1A:
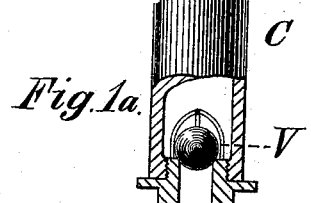
Figure 2:
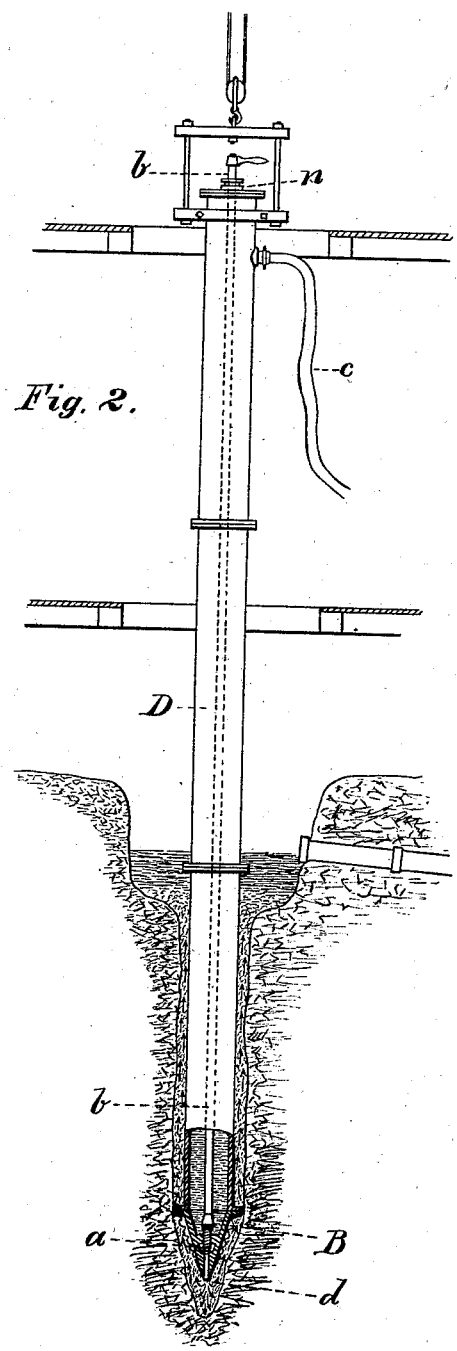

An elevator embodying my invention is illustrated as a whole in Figure 1. Fig. 2 represents the outer chamber of a hydraulic elevator, which is made of sections of iron pipe, joined together at the ends by means of bolts passing through flanges. This pipe is sometimes fifty or more feet in length, and is to be placed in the ground in a vertical position. In some soils a well can be dug; in others, such as contain much water, this depth of digging presents great difficulty.

In my elevator I have designed the pipe and its attachments with reference to that method of sinking known as the "hydraulic method," often applied to settling piles and foundations of bridges, &c.

I have terminated the outer chamber in my elevator by a conical casting, B, with a round channel extending through it along its axis, (represented at $d$, Fig. 2,) with a valve, $a$, at the inside end of $d$, which is opened and shut by means of a rod, $b$, passing through the length of the chamber D, and through a stuffing-box, $n$, at its upper end.

It is operated as follows: First, the pipe D is placed in a vertical position, and in guides directly over the position it is to occupy, where it is suspended by a pulley, as represented in Fig. 2; then the water is admitted to the upper end of the chamber by the hose $c$, connected with the city water, or any other source of water-pressure; then the valve $a$ is opened by means of the rod $b$, while at the same time the pipe is allowed to descend and occupy the place from which the water, in its exit through $d$, has dug the soil, the upward current of water by the side of the pipe having been found from experience sufficient to carry to the surface the soil thus excavated.

My invention does not consist in the use of a current of water for the purpose of sinking pipe, but in the arrangement of the valve $a$, rod $b$, and stuffing-box $n$, so as to open and shut the channel $d$ at pleasure, in connection with the use of the pipe D itself, to conduct the water to its lower end.

Fig. 1ª, represents the arrangement by means of which my elevator is made more safe than those constructed on the open hollow-ram plan without such safeguard. The danger in this plan arises from the fact that when the ram is more than thirty-two feet in length, if by any chance the platform is held while descending, the water falls away from the top of the ram, (the top being at the time of the supposed accident more than thirty-two feet above the outlet of chamber D,) producing a vacuum in the upper end. Now, if the obstruction be removed, the platform is liable to drop through a considerable distance with injurious force.

My improved elevator has at the lower end, (represented at V, Fig. 1ª,) or nearer than thirty-two feet from the lower end of the ram, a valve, which opens upward, allowing free passage to the water on entering, but preventing its exit, thus removing any chance for the danger described.

Figure 3:
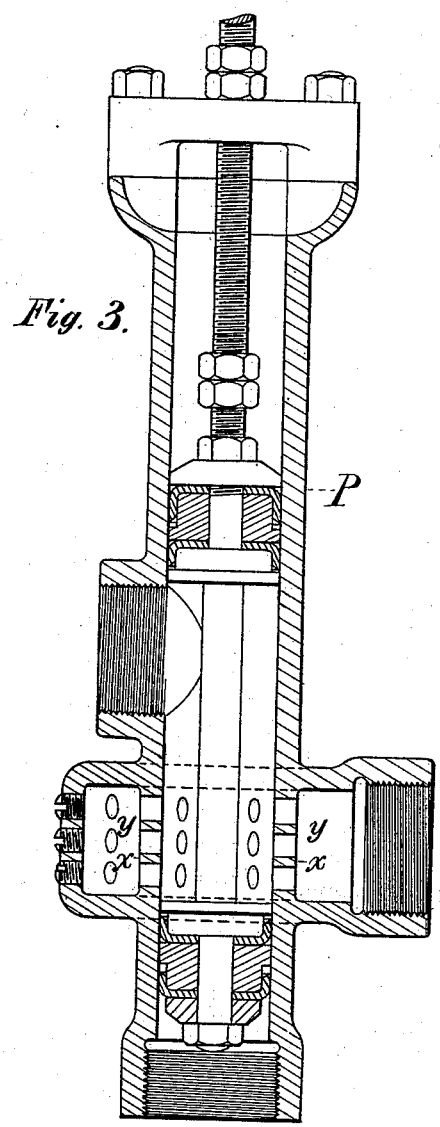

Fig. 1 shows the elevator with its fire attachment. Fig. 3 shows the valve P, which controls the inlet and exhaust of the elevator. The novelty of this valve consists in the simplicity of its construction. The general arrangement of inlet and outlet ports does not differ in any essential from those used for many years.

The annular space $y$ is cored in the casting entirely independent of the central cylindrical opening through the valve, and the partition $x$ is perforated, as desired, by drilling through the outer shell of the annular space $y$ and inner partition $x$ at one operation, after which the holes in the outer shell are plugged up, as represented in Fig. 3.

This improved feature in my elevator, so far as I can learn, gives the only valve with a perforated partition, $x$, between the annular space $y$ and the inside chamber of the valve, in which the body of the valve and the partition are one and the same casting.

This improvement makes the cost of the valve much less than any other construction possessing the same advantages of the annular space and perforated partition, while at the same time it does away with the necessity of any joint in the body of the valve—one always difficult to make.

What I claim is—

1. The combination of the chamber D, with its central passage $d$, valve $a$, and rod $b$, substantially as described.

2. The combination of the chamber D, passage $d$, valve $a$, rod $b$, and stuffing-box $n$, substantially as described.

3. The combination of the ram C and valve V, opening inwardly.

M. P. HIGGINS.

Witnesses:
EDWARD K. HILL,
EDWARD F. TOLMAN.